United States Patent

Appeltans et al.

[11] Patent Number: 5,886,513
[45] Date of Patent: Mar. 23, 1999

[54] DIGITALLY CONTROLLED SWITCHED-MODE VOLTAGE CONVERTER

[75] Inventors: Koen E. J. Appeltans, St. Trond, Belgium; Ferdinand J. Sluijs, Eindhoven, Netherlands

[73] Assignee: U.S. Philips Corporation, NY, N.Y.

[21] Appl. No.: 48,879

[22] Filed: Mar. 26, 1998

[30] Foreign Application Priority Data

Mar. 27, 1997 [EP] European Pat. Off. ............. 97200922

[51] Int. Cl.$^6$ ........................................... G05F 1/46
[52] U.S. Cl. ............................................ 323/283; 323/351
[58] Field of Search .................................. 323/222, 223, 323/282, 283, 349, 351

[56] References Cited

U.S. PATENT DOCUMENTS

| | | | |
|---|---|---|---|
| 5,272,614 | 12/1993 | Brunk et al. | 323/283 X |
| 5,499,177 | 3/1996 | Ichihara | 323/283 X |
| 5,552,694 | 9/1996 | Appeltans | 323/282 X |
| 5,594,324 | 1/1997 | Canter et al. | 323/282 |

FOREIGN PATENT DOCUMENTS

2746578A1  4/1978  Germany .

*Primary Examiner*—Peter S. Wong
*Assistant Examiner*—Y. J. Han
*Attorney, Agent, or Firm*—Steven R. Biren

[57] ABSTRACT

A digitally controlled switched-mode voltage converter having conversion circuit (CMS) including a switching device (SW) for the purpose of converting an input voltage ($U_i$) into an output voltage ($U_o$); and a control device (CM) for controlling a duty cycle of the switching device (SM) in steps having discrete values ($D_{c1}, D_{c2}$). The control device (CM) include a change-over device (SO) for continually switching the duty cycle between at least two discrete values ($D_{c1}, D_{c2}$) in such a manner that the average value of the duty cycle corresponds to a target duty cycle ($T_{dc}$).

5 Claims, 3 Drawing Sheets

DIGITALLY CONTROLLED SWITCHED-MODE VOLTAGE CONVERTER

BACKGROUND OF THE INVENTION

The invention relates to a digitally controlled switched-mode voltage convertor comprising conversion means including switching means for the purpose of converting an input voltage into an output voltage; and control means for controlling a duty cycle of the switching means in steps having discrete values.

Such a voltage convertor is known from German Patent Specification 2746578. In said converter the desired output voltage is obtained by the stepwise control of the duty cycle of a switch (i.e. the time during which the switch is closed divided by the sum of the time during which the switch is closed and the time during which the switch is open). For example, if the output voltage is to be raised the duty cycle is increased in steps.

A disadvantage of the known convertor is that the accuracy of the output voltage, i.e. the voltage resolution, is limited in that the voltage resolution is correlated with the time resolution of the voltage convertor, which time resolution is defined by the duty cycle, which can be adapted in discrete steps.

In the known voltage convertor the voltage resolution can be improved by reducing the step size of the discrete steps by a given factor. For a similar voltage range of the output voltage the number of discrete steps should then be increased by the same factor. This means that if the duty cycle of the switch is minimum, which occurs at the smallest possible value of the output voltage, the value of the duty cycle has been reduced by the above-mentioned factor. However, the maximum value of the duty cycle, which occurs at the largest possible value of the output voltage, does not change. It follows that the ratio between the maximum value of the duty cycle and the minimum value of the duty cycle has (potentially) increased by the above-mentioned factor. The shortest time during which the switch is closed (during the minimum value of the duty cycle) dictates the maximum period of a system clock that is required. This maximum period corresponds to a minimum system clock frequency of the system clock. It will be evident that in an attempt to improve the voltage resolution, by reducing the step size of the discrete steps (or by increasing the time resolution) by a given factor, the minimum system clock frequency increases by this given factor.

The above solution is disadvantageous because, in order to enable the voltage resolution to be made sufficiently high, the minimum required system clock frequency could be so high that the electronic circuitry required for this purpose is highly intricate, dissipates much power, or is even impracticable. A solution for this is to increase the switching period of the switch, i.e. the sum of the time that the switch is closed and the time that the switch is open, without the duty cycle being changed. In that case the minimum system clock frequency can be reduced proportionally. Phrased differently, the minimum system clock frequency is directly proportional to the minimum switching frequency (the reciprocal of the switching period of the switch).

However, the above-mentioned solution has another disadvantage. Switched-mode voltage convertors generally include a coil. The energy losses of the voltage convertor, for a given duty cycle, are then inversely proportional to the value of the self-inductance of the coil, and inversely proportional to the switching frequency. Since the self-inductance cannot be arbitrarily large in view of the coil dimensions, the efficiency of the voltage convertor will be lower in the case of a reduced switching frequency.

Summarizing, it can be stated that increasing the voltage resolution of the voltage convertor by increasing the time resolution is subject to limits imposed by a minimum system clock frequency, on the one hand, and a maximum system clock frequency, on the other hand.

Furthermore, it is to be noted that the capacitance of a smoothing capacitor, which is generally present, should be higher as the switching frequency decreases. This results in an undesirable increase in the size of the smoothing capacitor.

SUMMARY OF THE INVENTION

It is an object of the invention to provide a digitally controlled switched-mode voltage convertor which mitigates the afore-mentioned disadvantages.

To this end, according to the invention, the digitally controlled switched-mode voltage convertor of the type defined in the opening paragraph is characterized in that the control means include change-over means for continually switching the duty cycle between at least two discrete values in such a manner that the average value of the duty cycle corresponds to a target duty cycle.

A desired value of the output voltage, or the target output voltage, corresponds to the target duty cycle. Since in digitally controlled switched-mode voltage convertors the duty cycle can be controlled in steps the resulting value of the duty cycle generally does not correspond exactly to the target duty cycle. The invention is based on the recognition of the fact that when the duty cycle is continually switched between two discrete values, as a result of which the output voltage varies continually between two values, in such a manner that the average value of the duty cycle is then equal to the target duty cycle, the average value of the output voltage is equal to the target output voltage. The variation of the output voltage is eliminated by a filter action of the components present in the voltage convertor, such as the coil andor the smoothing capacitor, in the case of an appropriate dimensioning of the components. Thus, it is achieved that the output voltage is substantially equal to the target output voltage.

A voltage convertor in accordance with the invention is further characterized in that the change-over mean include memory means for storing at least one switching pattern which corresponds to a ratio between switching times for continually changing over the two discrete values of the duty cycle. By means of the target duty cycle a number is determined which selects an address of the memory means. The switching pattern or bit pattern corresponding to the selected address is read from the memory means and transferred to the change-over means in accordance with a cyclic time schedule.

The invention further relates to a method of converting an input voltage into an output voltage by means of a digitally controlled switched-mode voltage convertor, an input voltage being converted into an output voltage with the aid of switching means and a duty cycle of the switching means being controlled with the aid of control means in steps having discrete values.

A method in accordance with the invention is characterized in that the duty cycle is continually switched between at least two discrete values so as to make the average value of the duty cycle correspond to a target duty cycle.

BRIEF DESCRIPTION OF THE DRAWING

The invention will now be described in more detail with reference to the accompanying drawings, in which.

In these Figures like parts or elements bear the same reference symbols.

DESRIPTION OF THE PREFERRED EMBODIMENTS

Figure 1:
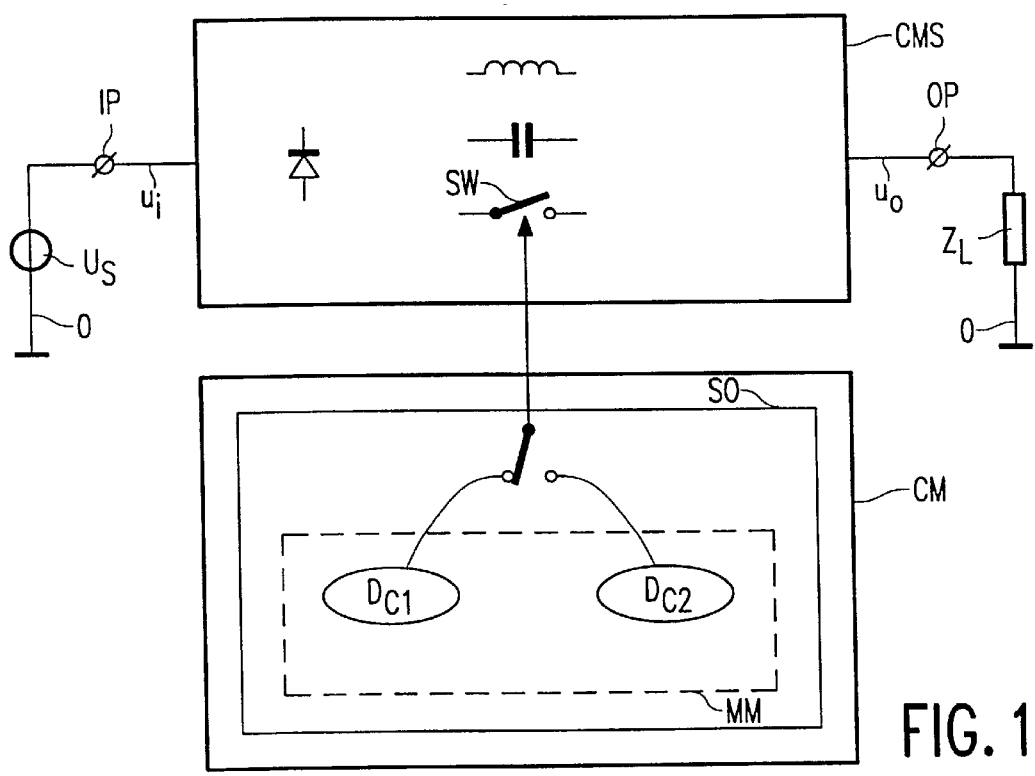
FIG. 1 shows a basic diagram of a digitally controlled switched-mode voltage convertor in accordance with the invention.

FIG. 1 shows a basic diagram of a digitally controlled switched-mode voltage convertor in accordance with the invention. The voltage convertor comprises conversion means CMS having switching means SM for the purpose of converting an input voltage $U_i$ into an output voltage $U_o$. The input voltage $U_i$, which appears on an input terminal IP of the voltage convertor, is supplied by a voltage supply means, for example a voltage source $U_S$. The voltage source $U_S$ is coupled between the input terminal IP and a ground terminal 0. The output voltage $U_o$, which appears on an output terminal OP of the voltage convertor, is supplied to a load $Z_L$ coupled between the output terminal OP and the ground terminal 0. The voltage convertor further comprises control means CM for controlling a duty cycle of the switching means SM in steps having discrete values $D_{c1}$, $D_{c2}$. The control means CM include change-over means SO for continually switching over between two discrete values $D_{c1}$, $D_{c2}$ in such a manner that the average value of the duty cycle corresponds to a target duty cycle. The required information about the switching times of the switching means SM are stored in memory means MM.

Figure 2:
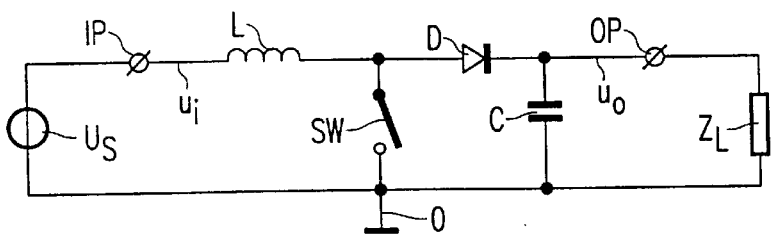
FIG. 2 shows an electrical circuit diagram of a conventional boost convertor.
Figure 3:
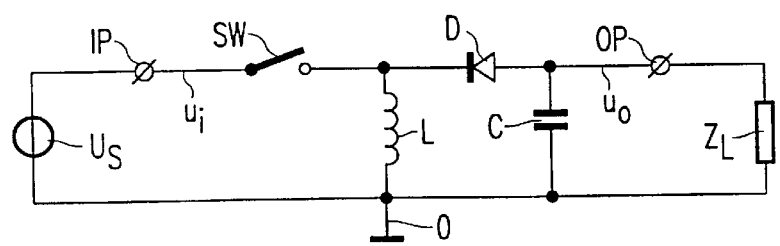
FIG. 3 shows an electrical circuit diagram of a conventional inverting convertor.
Figure 4:
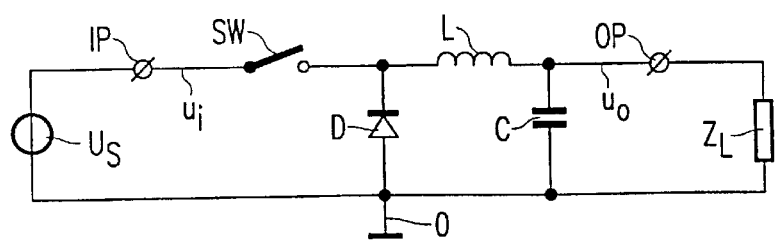
FIG. 4 shows an electrical circuit diagram of a conventional buck convertor.

FIGS. 2, 3 and 4 show known topologies of conversion means CMS which can be used in the voltage convertor in accordance with the invention. In these topologies a T network is formed by a coil L, a diode D, and switching means SM constructed as a switch SW. The T network is arranged between the input terminal IP, the output terminal OP, and the ground terminal 0. A smoothing capacitor C is arranged between the output terminal OP and the ground terminal 0. In the boost convertor of FIG. 2 the input terminal IP is coupled to the coil L, the output terminal OP is coupled to an electrode of the diode D, and the switch SW forms the vertical branch of the T network, which branch. is coupled to the ground terminal 0. In the inverting convertor of FIG. 3 the input terminal IP is coupled to the switch SW, the output terminal OP is coupled to an electrode of the diode D, and the coil forms the vertical branch of the T network. In the buck voltage convertor of FIG. 3 the input terminal IP is coupled to the switch SW, the output terminal OP is coupled to the coil L, and the diode D forms the vertical branch of the T network.

Figure 5:
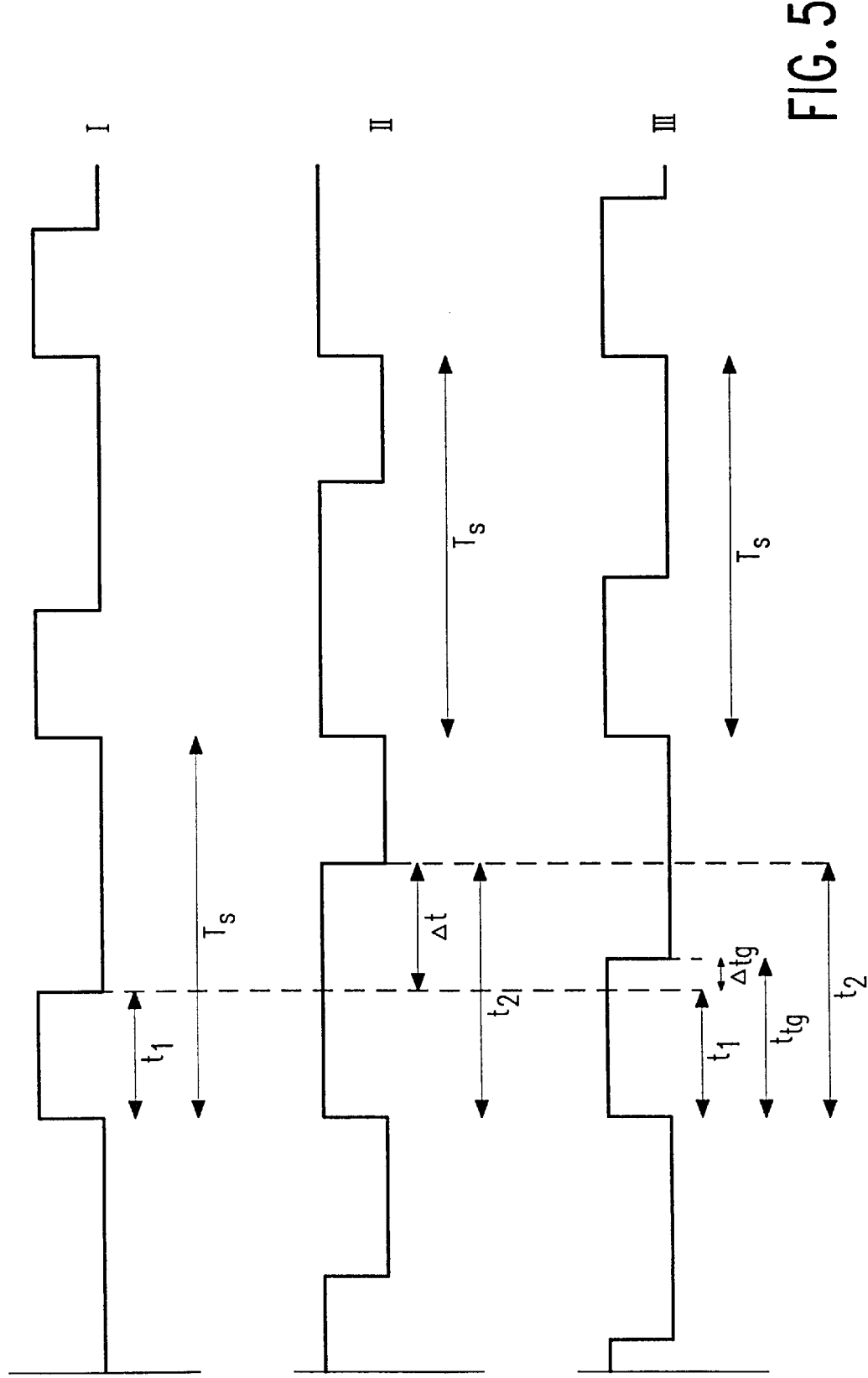
FIG. 5 shows diagrams to illustrate the operation of a voltage convertor in accordance with the invention.

FIG. 5 shows some diagrams (I,II,III) to illustrate the operation of the digitally controlled voltage convertor. The diagram I shows a switching pattern of the switch, SW, where $T_s$. is the switching period of the switch SW and $t_1$ indicates the time during which the switch SW is closed. A first discrete value of the duty cycle $D_{c1}$ of the switch SW is equal to $t_1/T_s$. The diagram II, similarly to the diagram I, shows a second discrete value of the duty cycle $D_{c2}$, which is equal to $t_2/T_s$, which complies with: $t_2=t_1+\Delta t$. Here, $\Delta t$ is the smallest possible time step. The diagram III shows an example of a target switching pattern whose target duty cycle is equal to the quotient of the target time $t_{tg}$ and the switching period $T_s$. The difference between the target time $t_{tg}$ and $t_1$ is designated $\Delta tg$. As $\Delta tg$ is not an integral multiple of (or equal to) $\Delta t$ this target duty cycle cannot be realized. It is possible, however, to realize a switching pattern (not indicated in FIG. 5) whose average duty cycle is equal to the target duty cycle by continually changing over between the two switching patterns I, II.

Figure 6:
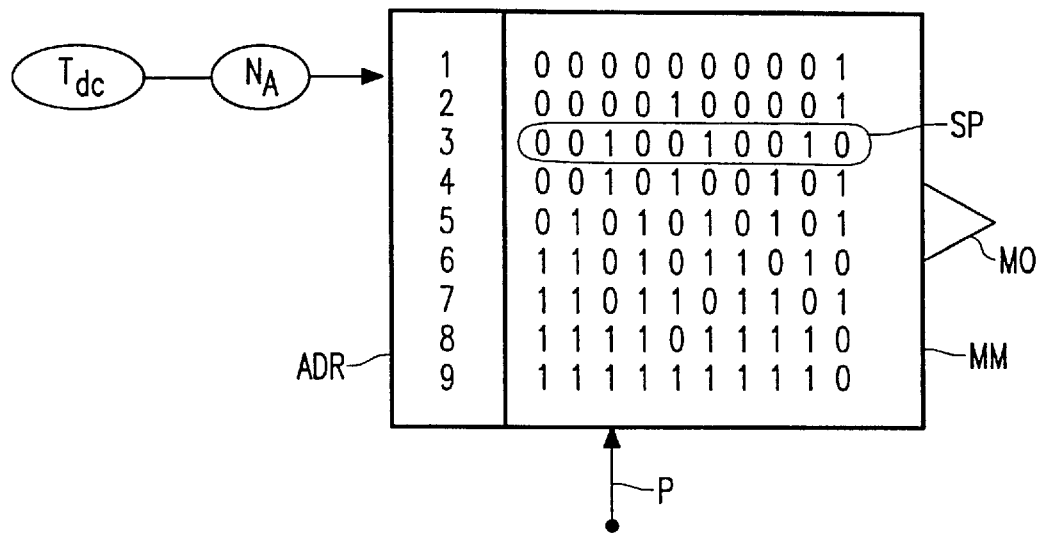
FIG. 6 shows a basic diagram of a memory for use in a digitally controlled voltage convertor in accordance with the invention.

FIG. 6 shows an example of a memory NN for use in digitally controlled voltage convertor in accordance with the invention. It is assumed, by way of example, that the voltage resolution should be improved by a factor of ten. This means that nine virtual intermediate values of a duty cycle are required, which intermediate values lie between two successive discrete values of the duty cycle. The nine intermediate values are stored as switching patterns SP in the memory MM. From the target duty cycle $T_{dc}$ a number $N_A$ is derived. The number $N_A$ refers to an address ADR of the memory MM for selection of the switching pattern SP. The selected switching pattern SP consists of zeros and ones. The bits appear cyclically on an output MO of the memory MM, the output MO being coupled to the change-over means SO. A pointer P determines which bit of the selected switching pattern SP appears on the output MO of the memory MM. For example, the position of the pointer P, as is shown in FIG. 6, can proceed from the left to the right in a bit by bit fashion, after which it returns after the right-most position to the left-most position, and then proceeds again from the left to the right in a bit by bit fashion. The number $N_A$ complies with the mathematical formula:

$$N_A = T_{dc} - \{S * ENTIER (T_{dc}/S)\} \qquad [1]$$

Here, S indicates the difference between two discrete values $D_{c1}, D_{c2}$ of the duty-cycle, and ENTIER is an operator which defines the integer of an operand. For example, ENTIER (3.73)=3.

The operation of the invention will now be explained by means of three specific examples.

EXAMPLE 1

Let it be assumed, for example, that: $T_s=50\ \mu s$; $t_1=10\ \mu s$; $t_2=20\ \mu s$; $\Delta t=10\ \mu s$. It follows that: $S=\Delta t/T_s=0.2$; It is further assumed that: $D_{c1}=t_1/T_s=0.2$; $D_{c2}=t_2/T_s=0.4$. Let it further be assumed that $\Delta tg=5\ \mu s$, from which it follows that: $t_{tg}=t_1+\Delta tg=15\ \mu s$ and $T_{dc}=t_{tg}/T_s=15\ \mu s/50\ \mu s=0.3$. The target-duty-cycle $T_{dc}$ is now exactly centered between the two discrete values $D_{c1}$ and $D_{c2}$. This means that the duty cycle of the switching means SM are determined by the duty-cycle $D_{c1}$ for 50% of the time and by the duty cycle $D_{c2}$ for the other 50% of the time. In this case the number $N_A$ should specify the address ADR 5. Indeed, the bits of the switching pattern SP corresponding to the address ADR 5 consists of logic ones for 50% and of logic zeros for 50%. In this case the logic zeros effect switching of the duty cycle $D_{c1}$ with the aid of the change-over means SO. Likewise, the logic ones effect switching of the duty cycle $D_{c2}$. The value of the number $N_A$ is calculated by means of the formula [1]:

$$N_A = 0.3 - 0.2 * \{ENTIER\ (0.3/0.2)\} = 0.3 - 0.2 * 1 = 0.1.$$

EXAMPLE 2

It is assumed, for example, that: $T_s = 50 \mu s$; $t_1 = 10 \mu s$; $t_2 = 20 \mu s$; $\Delta t = 10 \mu s$. It follows that: $S = \Delta t/T_s = 0.2$; It is further assumed that: $D_{c1} = t_1/T_s = 0.2$; $D_{c2} = t_2/T_s = 0.4$. It is also assumed that: $\Delta tg = 3 \mu s$, from which it follows that: $t_{tg} = t_1 + \Delta tg = 13 \mu s$ and $T_{dc} = t_{tg}/T_s = 13 \mu s/50 \mu s = 0.26$. The target duty cycle $T_{dc}$ is situated between the two discrete values $D_{c1}$ and $D_{c2}$. In this case the target duty cycle $T_{dc}$ is situated closer to the discrete value $Dc_1$ than to the discrete value $D_{c2}$, in such a manner that the following holds:

$$T_{dc} = 0.7 * D_{c1} + 0.3 * D_{d2}.(0.7*0.2 + 0.3*0.4 = 0.26)$$

In this case the number $N_A$ should specify the address ADR 3. Indeed, the bits of the switching pattern SP corresponding to the address ADR 3 consist of logic zeros for 70% and of logic ones for 30%. The value of the number $N_A$ is calculated by means of the formula [1]:

$$N_A = 0.26 - 0.2 * \{ENTIER\ (0.260.2)\} = 0.26 - 0.2 * 1 = 0.06.$$

EXAMPLE 3

It is assumed, for example, that: $T_s = 50 \mu s$; $t_1 = 10 \mu s$; $t_2 = 20 \mu s$; $\Delta t = 10 \mu s$. It follows that: $S = \Delta t/T_s = 0.2$; It is further assumed that: $D_{c1} = (3*t_1)/T_s = 0.6$; $D_{c2} = (4*t_1)/T_s = 0.8$. It is also assumed that: $t_{tg} = 43 \mu s$; $T_{dc} = t_{tg}/T_s = 33 \mu s/50 \mu s = 0.66$. De target duty cycle $T_{dc}$ is situated between the two discrete values $D_{c1}$ and $D_{c2}$. In the same way as in Example 2, it holds that:

$$T_{dc} = 0.7 * D_{c1} + 0.3 * D_{c2}.(0.7*0.6 + 0.3*0.8 = 0.66)$$

The target duty cycle $T_{dc}$ in the present example has another value than in Example 2. However, the relative position of the target duty cycle $T_{dc}$ with respect to the discrete values of the duty cycles $D_{c1}$ and $D_{c2}$ is similar to the relative position of the target duty cycle $T_{dc}$ of the discrete values of the duty cycles $D_{c1}$ and $D_{c2}$ of Example 2. In the present case the number $N_A$ should also specify the address ADR 3. The value of the number $N_A$ is again calculated by means of the formula [1]:

$$N_A = 0.66 - 0.2 * \{ENTIER\ (0.660.2)\} = 0.66 - 0.2 * 3 = 0.06.$$

This shows that the number $N_A$ indeed refers to the address ADR 3.

Alternatively, all the bits can be inverted. The same result is then obtained when an inverter is arranged between the output MO of the memory MM and the change-over means SO. For a correct operation of the invention it suffices that each of the switching patterns SP exhibit the correct proportion of ones and zeros. The switching pattern SP with the address ADR 3 can, for example, also consist of a sequence of three logic ones followed by seven logic zeros. However, it is desirable to arrange the logic ones and zeros as uniformly as possible in order to ensure that the variation or ripple of the output voltage is minimal.

In the example shown in FIG. 6 the switching patterns SP with the addresses ADR 6;7;8;9 have been inverted with respect to the switching patterns SP with the addresses ADR 4;3;2;1. This means that the capacity of the memory can be substantially halved because the switching patterns SP corresponding to the addresses ADR 6;7;8;9 can be derived from the switching patterns corresponding to the addresses ADR 4;3;2;1.

Figure 7:
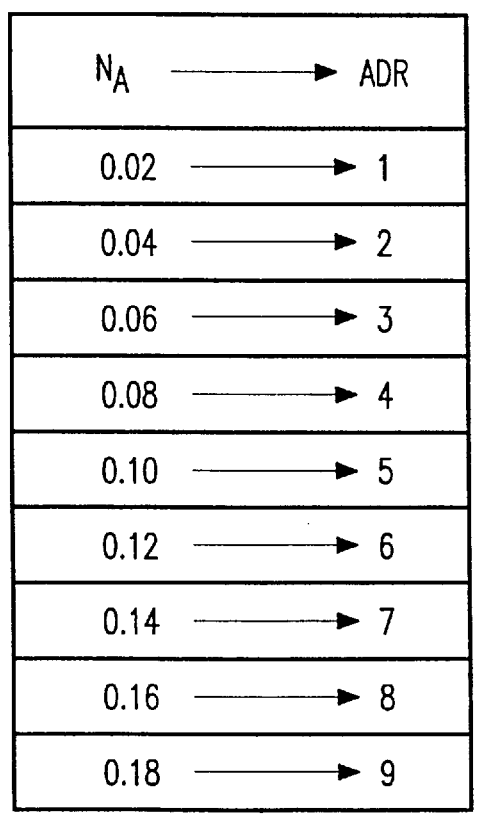
FIG. 7 shows an example of addressing a memory used in the invention.

FIG. 7 shows an example of addressing a memory used in the invention. This Figure shows how the value of the number $N_A$ corresponds to the address ADR of the memory MM. The numbers are based on the three specific examples given above.

If it appears from formula [1] that: $N_A = 0$, this means that the target duty cycle $T_{dc}$ is equal to a discrete value of the duty cycle. In that case the change-over means SO need not be switched over.

What is claimed is:

1. A digitally controlled switched-mode voltage convertor comprising conversion means (CMS) including switching means (SM) for the purpose of converting an input voltage ($U_i$) into an output voltage ($U_o$); and control means (CM) for controlling a duty cycle of the switching means (SM) in steps having discrete values ($D_{c1}, D_{c2}$), characterized in that the control means (CM) include change-over means (SO) for continually switching the duty cycle between at least two discrete values ($D_{c1}, D_{c2}$) in such a manner that the average value of the duty cycle corresponds to a target duty cycle ($T_{dc}$).

2. A voltage convertor as claimed in claim 1, characterized in that the change-over means (SO) include memory means (MM) for storing at least one switching pattern (SP) which corresponds to a ratio between switching times for continually changing over the two discrete values ($D_{c1}, D_{c2}$) of the duty cycle.

3. A voltage convertor as claimed in claim 2, characterized in that a number $N_A$ corresponds to an address (ADR) of the memory means (MM), where $N_A$ complies with the mathematical formula:

$$N_A = T_{dc} - \{S * ENTIER\ (T_{dc}/S)\}$$

in which $T_{dc}$ indicates the target duty cycle, S indicates the difference between two discrete values of the duty cycle, and ENTIER is an operator which defines the integer of an operand.

4. A voltage convertor as claimed in claim 3, characterized in that the change-over means (SO) are coupled, in order to receive the switching pattern (SP), to an output (MO) of the memory means (MM) whose address (ADR) has been selected by means of the number $N_A$.

5. A method of converting an input voltage ($U_i$) into an output voltage ($U_o$) by means of a digitally controlled switched-mode voltage convertor, an input voltage ($U_i$) being converted into an output voltage ($U_o$) with the aid of switching means (SM) and a duty cycle of the switching means (SM) being controlled with the aid of control means (CM) in steps having discrete values ($D_{c1}, D_{c2}$) characterized in that the duty cycle is continually switched between at least two discrete values ($D_{c1}, D_{c2}$) so as to make the average value of the duty cycle correspond to a target duty cycle ($T_{dc}$).

* * * * *